Patented May 15, 1951

2,552,533

UNITED STATES PATENT OFFICE 2,552,533

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application November 16, 1949, Serial No. 127,773

7 Claims. (Cl. 252—331)

This invention is a continuation-in-part of my two co-pending applications, Serial Nos. 104,801 and 104,802, both filed July 14, 1949.

Complementary to the aspect of the invention herein disclosed is my companion invention concerned with the new chemical products or compounds used as the demulsifying agents in the processes or procedures of this invention, as well as the application of such chemical compounds, products, or the like, in various other arts and industries, along with the method for manufacturing said new chemical products or compounds which are of outstanding value in demulsification. See my co-pending application, Serial No. 127,774, filed November 16, 1949.

The first of the aforementioned co-pending applications may be characterized by claim 1 of said co-pending application, which is as follows:

"A process for breaking petroleum emulsions of the water-in-oil type characterized by subjecting the emulsion to the action of a demulsifier including high molal oxypropylation derivatives of a member of the class consisting of monomeric polyhydric compounds and monomeric polyhydric derivatives thereof which bear a simple genetic relationship thereto, with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant."

Claim 1 of the second co-pending application is substantially the same, except that it is concerned with the high molal oxypropylation derivatives as such and not specifically for demulsification.

Attention is additionally directed to the co-pending application of Melvin De Groote, Serial No. 127,771, filed November 16, 1949. Briefly stated, the particular invention described in this co-pending application is concerned with the breaking of petroleum emulsions of the water-in-oil type characterized by subjecting the emulsion to the action of a demulsifier including high molal oxypropylation derivatives of oxyalkylated intermediates; said oxyalkylated intermediates being derived in turn from water-insoluble, xylene-insoluble, polypentaerythritols having at least 8 hydroxyl radicals with the proviso that (a) the initial polyhydric reactant be free from any radical having at least 8 uninterrupted carbon atoms; (b) the intermediate have a molecular weight in excess of 1200 and less than 25,000; (c) the intermediate product be obtained by an oxypropylation step involving a member of the class selected from ethylene oxide and glycide; (d) the intermediate product be water-dispersible, at least to the extent of colloidal solubility, and be xylene-insoluble; (e) the solubility characteristics of the intermediate in respect to water be substantially the result of the oxyalkylation step employing a member of the class consisting of ethylene oxide and glycide; (f) the oxypropylation end product be within the molecular weight range of 5,000 to 100,000 on an average statistical basis; (g) the oxypropylation end product be xylene-soluble; (h) the xylene solubility characteristics of the oxypropylation end product be substantially the result of the oxypropylation step; (i) the initial polyhydric reactant represent not more than 7% by weight of the oxypropylation end product on a statistical basis, and that (j) the preceding provisos be based on complete reaction involving the alkylene oxides and the initial polyhydric reactant.

The present invention is differentiated from the two previously described inventions in that the initial reactant is not water-soluble, thus being distinguished from the inventions in my co-pending applications, Serial Nos. 104,801 and 104,802, both filed July 14, 1949; and distinguished from the invention described in my co-pending application, Serial No. 127,771, filed November 16, 1949, insofar that the initially water-insoluble material is not subjected to an intermediate step such as treatment with ethylene oxide or glycide, or both, to render it at least colloidally water-soluble. Stated another way, in the instant invention the initially water-insoluble and xylene-insoluble material is treated at once with propylene oxide so as to render it xylene-soluble.

The final oxypropylation products are not only xylene-soluble but may be even water-dispersible, especially in the latter stages of oxypropylation. In the higher stages they are invariably water-insoluble and this applies particularly to the oxypropylation derivatives derived from polypentaerythritol of a molecular weight greater than that of hepta-pentaerythritol.

More specifically, then, the present process is concerned with treating petroleum emulsions of the water-in-oil type with the oxypropylation products obtained from tri-pentaerythritol and higher polypentaerythritols.

For convenience, what is said hereinafter is divided into three parts. Part 1 is concerned with the description of the polyhydric reactants employed, as well as reference to other compounds, products, etc., so there may be a clear line of demarcation between the present invention and what may appear elsewhere.

Part 2 is concerned with the preparation of the oxypropylated derivatives.

Part 3 is concerned with the use of an oxypropylated derivative as a demulsifier for petroleum emulsions of the water-in-oil type.

PART 1

Generally speaking, organic compounds having approximately the same number of oxygen atoms as carbon atoms are apt to be, and almost invariably are, water-soluble, and the most common could be illustrated by ethyl alcohol, methyl alcohol, acetic acid, acetone, formaldehyde, etc. When compounds reach enormously high molecular weights compared with such simple compounds, for instance, in the category of 30,000 to 50,000, or upward and preferably upward, such approximate ratio of carbon to oxygen does not necessarily guarantee water-solubility as, for example, in the case of cellulose or possibly some starches. There are other classes of comparatively low molecular weight compounds, for instance, polypentaerythritols, varying from tri-pentaerythritol to deca-pentaerythritol, where the molecular weight varies roughly from 372 to 1200, which are not water-soluble in the ordinary sense. Pentaerythritol is fairly water-soluble, approximately 4% or 5% in water at ordinary temperature. Di-pentaerythritol is soluble to the extent of two-tenths of one per cent and is an initial material employed in the process or composition described in my aforementioned co-pending applications, Serial Nos. 104,801 and 104,802, both filed July 14, 1949. The higher pentaerythritols do not qualify as a raw material in the aforementioned co-pending applications for the reason they do not meet the specification as to water-solubility prior to oxypropylation.

The present invention, then, is concerned more specifically with the use of the oxypropylation products derived from tripentaerythritol and higher poly-pentaerythritols. Such oxypropylation is conducted to the stage where the end products are xylene-soluble and have a molecular weight within the range of 5,000 to 65,000.

Basically the compounds herein described owe their peculiar properties to a number of factors immediately enumerated, at least in part:

(a) Size of molecule.

(b) Shape of molecule as far as space configuration goes.

(c) Absence of a single hydrophobe group having as many as 8 interrupted carbon atoms in a single radical.

(d) Substantial insolubility in water in certain instances.

(e) Solubility in xylene.

(f) The fact that the initial reactant requires the presence of at least 8 hydroxyl radicals.

(g) Such combination being obtained by reaction involving propylene oxide.

My preferred initial reactants are the polypentaerythritols as herein described. For purpose of convenience the word "polypentaerythritol" will mean those higher derivatives beginning with tri-pentaerythritol, up to and including the deca-pentaerythritols, or other comparable members of the class. In essence, this simply excludes di-pentaerythritol for reasons previously noted. In this connection in regard to the preparation of polypentaerythritols attention is directed to U. S. Patent No. 2,462,049, dated February 15, 1949, to Wyler. For instance, this patent mentions, among other things, the following:

| | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Other procedures have been described for preparing polypentaerythritol, using some other catalyst as described in British Patent No. 615,370, to Marrian and McLean (Imperial Chemical Industries, Ltd.).

The same catalyst as used in the above two mentioned issued patents illustrates a class of catalyst employed also to produce etherization in numerous other polyhydric compounds as, for example, in the case of polyglycerols, sorbitol, etc., etc. It is obvious that modified polypentaerythritol can be obtained by inter-mixing with another polyhydric alcohol, even though not water-insoluble, followed by etherization, to produce higher molecular weight product. For instance, two moles of tripentaerythritol could be polymerized with one mole of glycol or diglycerol to give a modified hexa-pentaerythritol which, in essence, might be somewhat analogous to a hexa-pentaerythritol treated with glycide, although not necessarily so. Similarly, other polyhydric alcohols, such as sorbitol, sorbitan, mannitan, mannitol, and tetramethylolhexanol, can be employed, provided, however, that the resultant used as an initial reactant is water-insoluble, and xylene-insoluble, has at least 8 hydroxyls and a molecular weight not in excess of 1200. Such materials can be varied in an inconsequential or insignificant sort of way without detracting from the structure of the final oxypropylated derivative, for instance, a number of the hydroxyl groups might be converted into an acetal or a ketal in the conventional manner; or one might produce an ester of a low molal acid, such as acetic acid, glycollic acid, lactic acid, propionic acid, etc. Tri-pentaerythritol could be treated with a mole of ethylene oxide or several moles of ethylene oxide, or a mole of glycide, or a mole of butyl oxide, or methyl glycide, and then subjected to polymerization so as to give materials which, obviously, are the chemical and also physical-chemical equivalent of the herein specified preferred and commercially available reactants, i. e., the polypentaerythritols.

My preferred reactants are tri-pentaerythritol, which is sold commercially, and a higher polypentaerythritol (average hydroxyl content 32.3). My third preferred reactant is the tetra-pentaerythritol manufactured in the manner described in Example 2 of aforementioned British Patent No. 615,370.

In a preceding paragraph reference has been made to substantial insolubility in water in certain cases. In examining the data in Part 2 of the text it will be noted that the derivatives are limited to those which show xylene-solubility and that in the higher stages of oxypropylation the derivatives show water-insolubility or substantial water-insolubility. This is illustrated by examples and, as a matter of fact, in many instances the water-insoluble derivatives are particularly to be preferred for use as demulsifiers.

PART 2

Part 2 is concerned with the production of xylene-soluble derivatives from tri-pentaerythritol or higher polypentaerythritol by oxypropylation. The equipment employed is designed primarily for oxyethylation but is equally satisfactory for oxypropylation. The reason the equipment is designed for oxyethylation is that oxyethylation frequently involves higher pressures than oxypropylation; thus, equipment which is safe for oxyethylation is obviously safe for oxypropylation.

The oxypropylation procedure employed in the preparation of the xylene-soluble derivatives has been uniformly the same, particularly in light of the fact that a continuous operating procedure was employed. In this particular procedure the apparatus was a conventional autoclave, made of stainless steel and having a capacity of about one gallon and a working pressure of 100 pounds gauge pressure. The autoclave was equipped with conventional devices and openings, such as the variable stirrer operating at speeds from 50 R. P. M. to 500 R. P. M., thermometer well and thermocouple for mechanical thermometer; emptying outlet; pressure gauge; manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket and, preferably coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide or ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other convenient equipment consists, of course, of the rupture disc, pressure gauge, sight feed glass, thermometer, connection for nitrogen for pressuring bomb, etc. The bomb was placed on a scale during use and the connections between the bomb and the autoclave were flexible stainless steel hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations become uniform in that the reaction temperature could be held within a few degrees of any selected point in this particular range.

In the early stages where the concentration of catalyst is high the temperature was generally set for around 160° C. or thereabouts. Subsequently, temperatures up to 180° C. or higher may be required. It will be noted by examination of subsequent examples that this temperature range was satisfactory. In any case, where the reaction goes more slowly a higher temperature may be used, for instance, 185° C. to 190° C., and if need be 200° C. to 210° C.

The propylene oxide was forced in by means of nitrogen pressure as rapidly as it was absorbed as indicated by the pressure gauge in the autoclave. In case the reaction slowed up the temperature was raised so as to speed up the reaction somewhat by use of extreme heat. If need be, cooling water was employed to control the temperature.

As is obvious in the case of oxypropylation if there is a tendency for the reaction to slow up as the temperature drops appreciably, the selected point of reaction, for instance 175° or 180° or 185° C., whatever it happens to be, can be maintained by speeding up the reaction by merely cutting down the cooling water or increasing the steam input, or speeding up the reaction by increasing the rate of the input of the propylene oxide; or, if required, electric heat can be used in addition to steam in order to make the reaction proceed somewhat near the selected temperature point.

Inversely, if the reaction proceeds too fast the amount of reactant can be cut down or electrical heat cut off, or steam reduced, or if need be cooling water can be run through the jacket and the cooling coil both. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

*Example*

The reaction vessel employed was a stainless steel autoclave with the usual devices for heating, heat control, stirrer, inlet, outlet, etc., which are conventional in this type of apparatus. Two different sizes were employed. In part of the experiments the capacity of the autoclave was 3½ liters, and in the other experiments a 5-liter capacity autoclave was employed. This was purely a matter of convenience. Otherwise the construction and operation of both autoclaves were the same. In both instances the stirrers operated at a speed of approximately 300 to 350 R. P. M. There were charged into the autoclave 200 grams of tri-pentaerythritol along with 200 grams of solvent (xylene). Any nonvolatile inert solvent, such as xylene, decalin, diethylether of ethylene glycol, or a higher boiling aromatic solvent, such as mesitylene, can be used. Approximately 10 grams of catalyst were added. Sodium methylate was used although ground caustic soda or ground caustic potash or any one of a number of other alkaline catalysts are equally suitable. The autoclave was sealed, swept with nitrogen gas, and stirring started immediately and heat applied, and the temperature allowed to rise to approximately 160° C. At this point addition of propylene oxide was started. It was added continuously at such speed that it was absorbed by the reaction as rapidly as added. During this first period approximately 1650 grams of propylene oxide were added. The time required was 3¼ hours. The maximum temperature was 100 pounds per square inch.

The product obtained still showed dispersibility in water and was not appreciably soluble in xylene. Part of the batch was allowed to stay in the autoclave. The exact amount was 790.5 grams. The amount of solvent present was 85 grams. No additional sodium methylate was added. In this second stage 895 grams of propylene oxide were added. The time required was 2 hours. The maximum temperature was 173° C., and the maximum pressure 100 pounds per square inch. At the end of the reaction time the ratio of propylene oxide to initial reactant was 120 to 1 as compared to 53 to 1 in the first stage. The product still showed some tendency to disperse in water but was xylene-soluble.

The further addition of propylene oxide was made in subsequent stages until the product was practically insoluble in water. The data are recorded in the following table. It is to be noted that additionally two other poly-pentaerythritols were treated with propylene oxide and data included in the table, also.

zation, probably due to the inherent nature of the initial raw material or a subsequent caramelization-like reaction.

The derivatives so obtained can be decolorized in the usual manner by treating with charcoal, filtering clay, or the like. If the solvent is to be removed and the product has to be decolorized also, it appears better to remove the solvent and then decolorize, or else there may be some decolorization due to the heat used in solvent removal. However, for the bulk of purposes for which such materials are used there is no necessity for decolorizing and in many instances, as in the present instance, the solvent may remain in the material.

It will be noted that the molecular weight range of the final products is within the ratio of 5,000 to 65,000. Experimentation with polypentaerythritols higher than hepta-pentaerythritol has resulted in compounds which appear to be in the approximate weight range of 50,000 to 60,000. This figure cannot be set exactly for the reason that the exact composition of the higher polypentaerythritols is not exactly known. An attempt was made in this case to produce a deca-pentaerythritol and the composition may vary somewhat from the theoretical formula. For this reason, in the claims 65,000 was set as the upper limit.

It is obvious that certain modifications can be made which do not depart from the spirit of the invention. The initial raw materials, i. e., the specified polypentaerythritols or modifications thereof which bear a simple genetic relationship to polypentaerythritols are water-insoluble materials. They are water-insoluble and xylene-insoluble. Such initial materials are treated in the manner described to yield materials which, as far as xylene-solubility goes, are xylene-insoluble. Needless to say, the initial material could be treated with a mole or two, or thereabouts, of ethylene oxide or glycide, without

| Ex. No. | Derivative No. | Amt. Taken, Gms. (Solvent Free) | Solvent Present, Gms. (Xylene) | Sod. Methylate Added, Gms. | PrO Added, Gms. | Time, hrs. | Temp. Max., °C. | Max. Pres., lbs. per sq. in. | Molar Ratio of PrO to Initial Reactant | Solubility in Water | Solubility in Xylene | Molecular Wt. |
|---|---|---|---|---|---|---|---|---|---|---|---|---|
| 1 | (¹) | 200 | 200 | 10 | 1,650 | 3¼ | 185 | 100 | 53:1 | Dispersible | No | 3,450 |
| 2 | 1 | 790.5 | 85 | | 895 | 2 | 173 | 100 | 120:1 | Tendency to disprs | Yes | 7,432 |
| 3 | 2 | 743 | 9 | | 700 | 3¼ | 186 | 135 | 240:1 | Less disprs | Yes | 14,290 |
| 4 | 3 | 725 | 4 | 3 | 350 | 2¾ | 190 | 132 | 360:1 | Almost insol | Yes | 21,000 |
| 5 | (²) | 245 | 200 | 12.5 | 3,063 | 2 | 170 | 90 | 179:1 | Dispers | Yes | 11,285 |
| 6 | 5 | 613.2 | 37.8 | | 307 | 1 | 165 | 90 | 279:1 | Almost Disprs | Yes | 17,085 |
| 7 | 6 | 688.1 | 27.9 | 2 | 102 | ¼ | 170 | 180 | 328:1 | Insol | Yes | 20,195 |
| 8 | 7 | 547.8 | 19.2 | | 160 | ¼ | 165 | 100 | 418:1 | Insol | Yes | 27,200 |
| 9 | 8 | 545 | 15 | 2 | 58 | ½ | 180 | 110 | 468:1 | Insol | Yes | 31,100 |
| 10 | (³) | 490 | 300 | 12 | 1,750 | 2¾ | 192 | 130 | 30:1 | Disprs | No | 2,240 |
| 11 | 10 | 553 | 75 | | 580 | 3¼ | 188 | 104 | 70:1 | Almost Disprs | No | 4,450 |
| 12 | 11 | 567 | 37 | | 580 | 2½ | 165 | 102 | 150:1 | Almost Insol | Yes | 9,200 |
| 13 | 12 | 573 | 18 | 3 | 290 | 1¼ | 135 | 90 | 230:1 | Insol | Yes | 13,340 |
| 14 | 13 | 431 | 9 | | 290 | 2¼ | 145 | 108 | 310:1 | Insol | Yes | 18,510 |
| 15 | 14 | 721 | 9 | | 290 | 1¾ | 125 | 125 | 390:1 | Insol | Yes | 23,100 |

¹ Tri-pentaerythritol.
² Hepta-pentaerythritol.
³ Tetra-pentaerythritol.

The products obtained above, of course, contain a solvent, to wit, xylene in this particular instance. The solvent can be removed in the conventional manner by vacuum distillation. In the case of xylene a temperature of 180° C. to 200° C. is perfectly satisfactory. The products obtained are usually viscous somewhat sirupy liquids of an amber, dark amber, or reddish color. The color may be due to a trace of iron because of contamination from the vessel employed. However, even when stainless steel is employed of such character that contamination by iron seems out of the question, there is still discoloribringing it within the range of my aforementioned co-pending application, Serial No. 127,771, filed November 16, 1949.

Similarly, after oxypropylation starts one could interrupt the procedure and introduce a mole or two of ethylene oxide, or glycide, and then resume oxypropylation. Either one of such minor modifications would not significantly, nor perhaps even detectibly, change the character of the initial raw material or the final oxypropylation derivative. Needless to say, such variation would not be departing the slightest from the spirit of the invention.

If one examines the previous table it will be noted that starting with a raw material having a molecular weight of less than 1,000 one could obtain readily materials where the molecular weight is in excess of 30,000 or more. Stated another way, the initial raw material may contribute as little as 1% to the final product. The upper range is approximately 5%, i. e., the initial reaction contributes from a fraction of 1% up to 5%, 6% or 7% of the final product.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil soluble form, or in a form exhibiting both oil- and water-solubility. Sometimes they may be used in a form which exhibits relatively limited oil-solubility. However, since such reagents are used frequently in a ratio of 1 to 10,000 to 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g. the bottom of the tank, and re-introduces it into the top of the tank, the demulsifier being added, for example, at the suction side of said circulating pump.

In a second type of treating procedure the demulsifier is introduced into the well fluids at the well head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases it will be apparent from the foregoing description the broad process consists simply in introducing a relatively small proportion of demulsifier into a relatively large proportion of emulsion, admixing the chemical and emulsion either through natural flow or through special apparatus, with or without application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce a clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 8, with 15 parts by weight of xylene and 10 parts by weight of isopropyl alcohol, an excellent demulsifier is obtained. Selection of the solvent will vary depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, a mixture which exemplifies such combination is the following:

Oxypropylated derivative, for example, the product described as Example 8, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Having thus described my invention, what I claim as new and desire to secure by Letters Patent, is

1. A process for breaking petroleum emulsions of the water-in-oil type characterized by subjecting the emulsion to the action of a demulsifier including high molal oxypropylation derivatives of water-insoluble, xylene-insoluble, polypentaerythritols having at least 8 hydroxyl radicals and derivatives which bear a simple genetic relationship thereto, with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; and that (f) the preceding provisos be based on complete reaction involving the propylene oxide and the initial polyhydric reactant.

2. A process for breaking petroleum emulsions of the water-in-oil type characterized by subjecting the emulsion to the action of a demulsifier including high molal oxypropylation derivatives of water-insoluble, xylene-insoluble, polypentaerythritols having at least 8 hydroxyl radicals, with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; and that (f) the preceding provisos be based on complete reaction involving the propylene oxide and the initial polyhydric reactant.

3. A process for breaking petroleum emulsions of the water-in-oil type characterized by subjecting the emulsion to the action of a demulsifier including high molal oxypropylation derivatives of water-insoluble, xylene-insoluble, polypentaerythritols having at least 8 hydroxyl radicals, with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product be xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; (f) the end product be substantially water-insoluble; and that (g) the preceding provisos be based on complete reaction involving the propylene oxide and the initial polyhydric reactant.

4. The process of claim 3 with the proviso that the molecular weight of the end product is within the range of 20,000 to 30,000.

5. The process of claim 3 with the proviso that the molecular weight of the end product is within the range of 20,000 to 30,000, and the initial reactant is tri-pentaerythritol.

6. The process of claim 3 with the proviso that the molecular weight of the end product is within the range of 20,000 to 30,000, and the initial reactant is tetra-pentaerythritol.

7. The process of claim 3 with the proviso that the molecular weight of the end product is within the range of 20,000 to 30,000, and the initial reactant is hepta-pentaerythritol.

MELVIN DE GROOTE.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,278,838 | De Groote et al. | Apr. 7, 1942 |
| 2,281,419 | De Groote et al. | Apr. 28, 1942 |
| 2,307,058 | Moeller | Jan. 5, 1943 |
| 2,430,002 | De Groote et al. | Nov. 4, 1947 |
| 2,454,541 | Bock et al. | Nov. 23, 1948 |